Aug. 1, 1933.  H. B. HASKINS ET AL  1,920,466
HINGE
Filed June 17, 1931
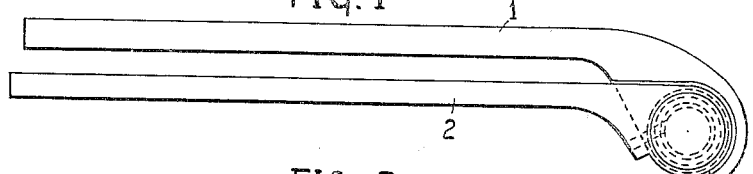
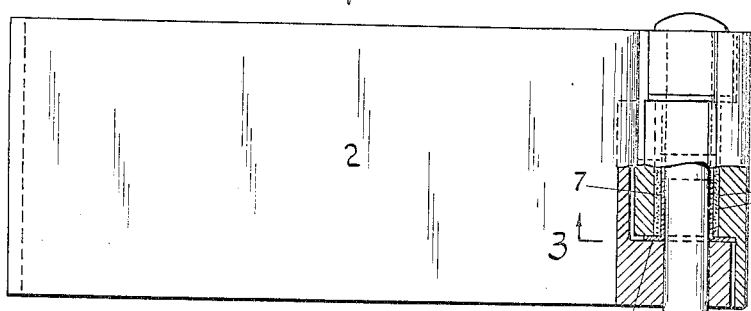
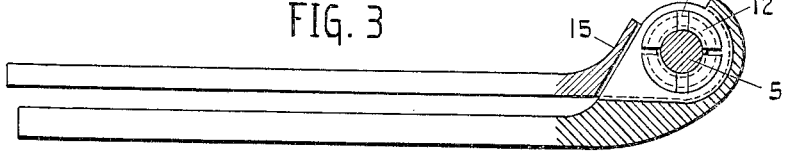
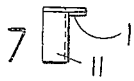
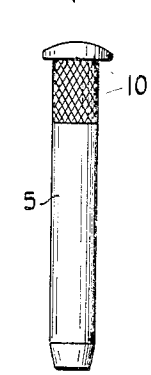
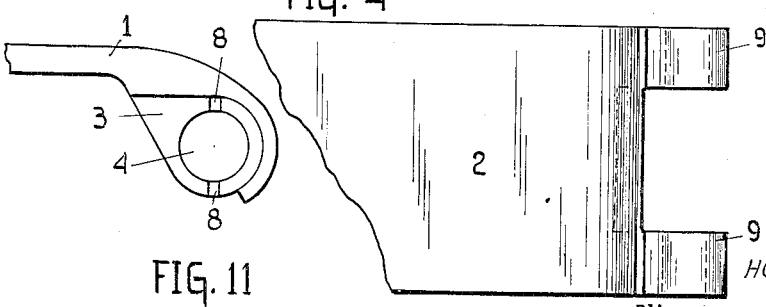
INVENTORS
HOWARD B. HASKINS.
JOHN W. LAKIN.
BY Barnes & Kisselle
ATTORNEYS.

Patented Aug. 1, 1933

1,920,466

UNITED STATES PATENT OFFICE 1,920,466

HINGE

Howard B. Haskins, Highland Park, and John W. Lakin, Detroit, Mich., assignors to Ternstedt Manufacturing Company, Detroit, Mich., a Corporation of Michigan Application June 17, 1931. Serial No. 545,036

7 Claims. (Cl. 16—128)

This invention relates to a hinge, and more particularly to that type of hinge adapted for use on an automotive vehicle body.

It is an object of this invention to produce a hinge which is rattle proof and the parts of which are free to move within limits relatively to each other besides the normal hinging movement.

It is an object of this invention to produce a hinge the butts of which are interconnected by a hinge pin having a floating journal.

It is an object of this invention to produce a hinge having a rubber floated hinge pin and means for preventing excessive tortion of the rubber.

It is an object of this invention to produce a hinge having a rubber floated hinge pin and bushing in which the wear between the pin and bushing is automatically taken up to prevent any rattling between the pin and the bushing.

In the drawing:

Fig. 1 is a plan view of the hinge with the butts in closed relation.

Fig. 2 is a side elevation partly in section of the hinge.

Fig. 3 is a section along the line 3—3 of Fig. 2.

Figs. 4 and 5 are detailed views of the male and female butts respectively.

Figs. 6 and 7 are detail views of the bushing members.

Figs. 8 and 9 are detail views of the rubber tube.

Fig. 10 is a detail view of the hinge pin.

Fig. 11 is a fragmentary view of the male hinge butt.

Referring more particularly to the drawing, the male hinge butt may be referenced 1 and the female butt 2. The butt 1 has a pintle bearing portion 3 provided with an opening 4 for reception of the hinge pin 5, the associated rubber tube 6, and the brass split bushing 7. The bearing portion 3 of the male butt 1 is provided adjacent the opening 4 with the diametrically opposed recesses 8. The recesses 8 are provided at each end of the opening 4. The female butt 2 is provided with the knuckles 9 having the usual openings for reception of the hinge pin 5. In this specific instance the hinge pin 5 is provided with the knurled portion 10. Hence when the hinge pin 5 is driven into the openings provided in the knuckles 9 of the female butt 2 the knurled portion 10 digs into the sides of the opening and prevents relative rotation between the pin 5 and the hinge butt 2.

The opening 4 is lined with a tube 6 of distortable material, preferably rubber. It is well known that during the summer months, especially while parked in the open, an automobile is subjected to heat conditions detrimental to rubber. Hence, if a rubber tube such as 6, after being subjected to such adverse heat conditions, is twisted a sufficient number of times it will reach a fatigue limit and if subjected to any further tortion or twisting action and then released, it will not return to its original shape or form. Since the function of the rubber tube 6 is to permit relative movement, other than the normal hinging movement, of the hinge pin 5 and the male butt 1, tube 6 must of necessity be compressed and distorted. Hence, in order to permit compression and distortion of the rubber tube and yet to reduce to a minimum any twisting action to which the rubber tube 6 is subjected, which as pointed out above, soon kills the rubber, it is proposed to interpose between the tube 6 and the pin 5 a split bushing 7 of any suitable bearing metal or alloy such as brass as shown in Figures 6 and 7. Any suitable lubricant non-detrimental to rubber such as graphite may be used between the bushing and the hinge pin. The split bushing 7 is made up of two separate members each comprising an arcuate portion 11 and an arcuate flange 12. Both the arcuate portion 11 and the flange 12 are somewhat less than 180°. It will be noted that the arcuate flange 12 has a depression 13 which forms the projection 14. This projection 14 is placed centrally of the arcuate flange 12. When in position, as nicely brought out in Figure 2, the portions 11 project into the opening 4 between the tube 6 and the pin 5 and the arcuate flanges 12 fit between the upper and lower faces of the bearing portion 3 of the male member and the inner faces of the hinge knuckles 9. Inasmuch as the bushing portions are somewhat less than 180° when in assembled position with the hinge pin (Fig. 3) there is a clearance 15 between the same.

It will be noted that the projections 14 fit into the recesses 8 and thus prevent any material turning of the split bushing 7 relative to the male member. The relation of the recesses 8 and the projections 14 are such that the split bushings 7 can expand or contract radially of the opening 4. In operation it is evident that since the hinge pin 5, owing to the knurl 10 is fixed relative to the female butt 2 and since the split bushing 7 cannot rotate materially relative to the opening 4 in the male butt 1, therefore when the hinge opens or closes relative rotation will occur between the pin 5 and the inner faces of the bushing portions 11. The tortion of the rubber, as the hinges are opened and closed, is limited by the small commercial tolerances allowed between the projections on the bushing 14 and the recesses 8 in the knuckle 3. When the rubber tube is placed within the opening 4 it is loaded and when the bushings and the hinge pin are in assembled position the rubber is placed under a still greater load so that it never leaves the bushing regardless of the relative position of the pin in the opening 4. Since the bushings 7 are split and have a clearance 15, the bushing is free to accommodate itself to the hinge pins of varying sizes within the limits of commercial tolerances allowed.

The recesses 8 are positioned relatively to the main portion of the butt 1 so that the split 15 between the bushing members is aligned with a line parallel to the longitudinal axis of the main portions of the butts 1 and 2 when the hinge is in the closed position as shown in Figures 1 to 3. This arrangement of the recesses 8 and associated bushing 7 so that the split occurs on a line parallel to the longitudinal axis of the hinge butt is desirable in that when the vehicle body is in operation the doors will be closed, the hinge butts in the position shown in Figure 1, and the main vibration will be in and out or transversely to the longitudinal axis of the hinge butts.

It will be noted that the loading of the rubber in the arrangement of the bushing is such that all wear between the bushing and the pin is automatically taken up. Further, the arrangement between the bushing, the loaded rubber and the pin is such that the bushing accommodates itself to any irregularities which are present in the pin.

From the above description it is evident that there is herein produced a hinge assembly in which the hinge butts are free to float relatively to each other within limits other than that of the normal hinging action, and in which all wear and irregularities between the hinge pin and pin bushing are automatically accommodated or taken up.

We claim:

1. A hinge comprising in combination apertured male and female butts, a pin adapted to be received in the said apertures for interconnecting the said butts, distortable material positioned in one of said apertures, and a bushing split longitudinally thereof interposed between the distortable material and the said pin the said pin having a greater diameter than the bushing when closed.

2. A hinge comprising in combination an apertured male butt and an apertured female butt, a hinge pin adapted to be received in the said apertures for interconnecting the said butts, a rubber tube positioned in one of said apertures and surrounding a portion of the said pin, and a radially expansible metal bushing interposed between the pin and the rubber tube the said pin having a greater diameter than the bushing when closed.

3. A hinge comprising in combination an apertured male butt and an apertured female butt, a pin adapted to be received in the said apertures for interconnecting the said butts, a rubber tube positioned in one of the said apertures and surrounding the said pin, a metal bushing having a lesser diameter when closed than said pin and split longitudinally thereof interposed between the pin and the rubber, and means interlocking the bushing and one of the said hinge butts against relative rotation to prevent twisting of the rubber tube by the bushing.

4. A hinge comprising in combination apertured male and female butts, a hinge pin for interconnecting the said butts and fixed relative to one of said butts and having a clearance with the aperture of the other butt, distortable material in the said clearance and a wear resisting bushing split lengthwise of the said pin and interposed between the distortable material and the said pin, and means for interengaging the split bushing and the hinge butt whereby the bushing is free to expand radially but held against rotation relative to the distortable material and the hinge butt.

5. A hinge comprising in combination male and female apertured hinge butts, a hinge pin, a rubber tube surrounding a portion of the said pin, a radially expansible metal bushing interposed between the rubber tube and the hinge pin, one of said hinge butts having a recess, the said expansible bushing having a projection adapted to interfit in the said recesses to prevent relative rotation movement between the rubber tube the hinge butt and the said bushing.

6. A hinge comprising in combination apertured male and female butts, a pin adapted to be received in the said apertures for interconnecting the said butts, a loaded rubber member positioned in one of said apertures and an expansible bushing interposed between the loaded rubber and the said pin whereby any wear between the pin and the bushing is automatically taken up.

7. A hinge comprising in combination apertured male and female butts, a pin adapted to be received in said apertures for interconnecting the said butts, loaded distortable material positioned in one of said apertures and an expansible bushing interposed between the distortable material and the said pin, and means interconnecting the said bushing and one of the hinge butts whereby the distortable material is free to be compressed without any substantial tortion of the same.

HOWARD B. HASKINS.
JOHN W. LAKIN.